Patented May 16, 1950

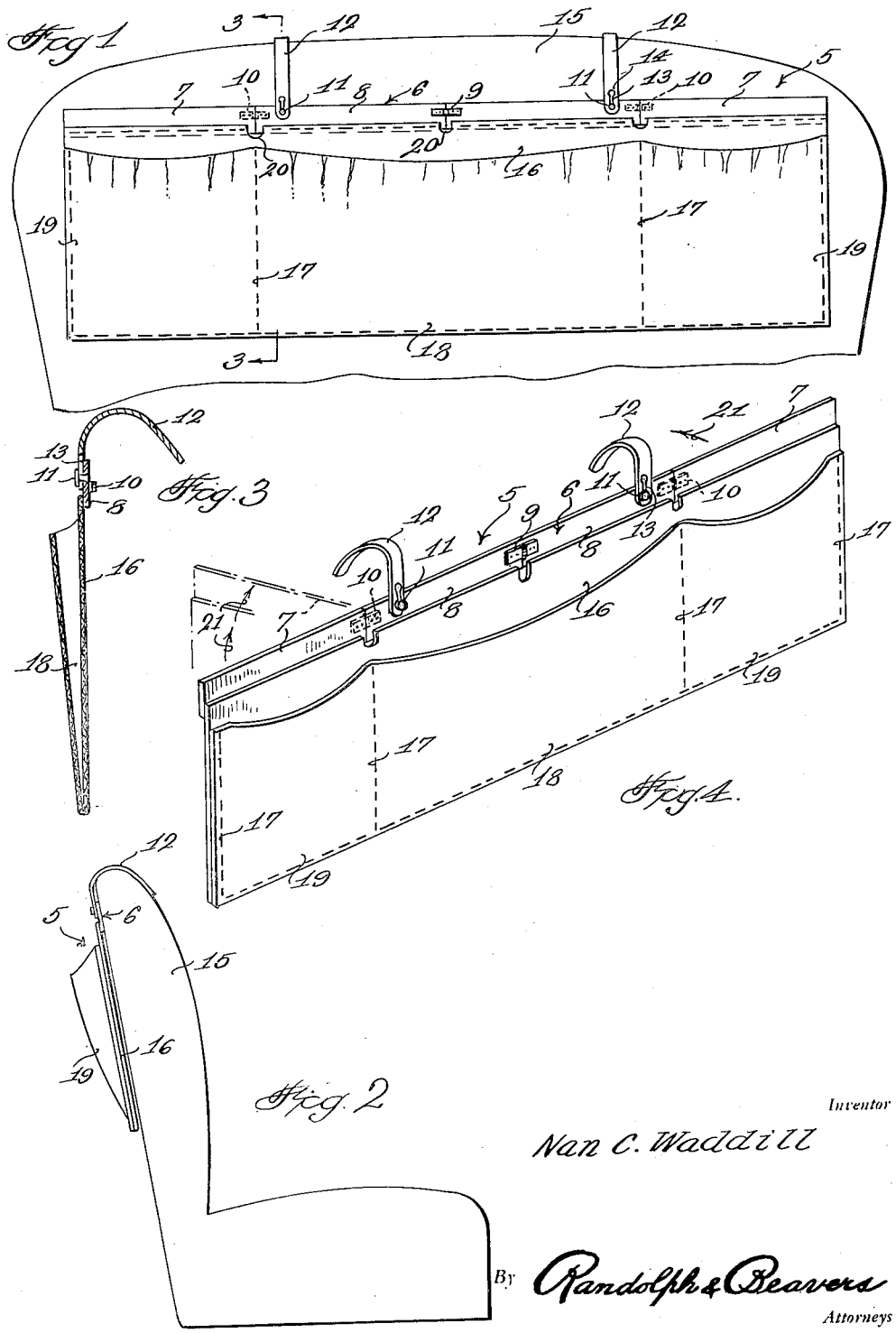

2,507,842

UNITED STATES PATENT OFFICE 2,507,842

DEMOUNTABLE RECEPTACLE FOR MOTOR VEHICLES

Nan C. Waddill, Irwin, Nebr.

Application October 17, 1947, Serial No. 780,472

4 Claims. (Cl. 224—42.46)

This invention relates to a demountable receptacle or container especially adapted for passenger motor cars and more particularly has reference to a fabric container having means for detachably supporting it on the back of the front seat of an automobile and which includes a plurality of pockets conveniently disposed to all passengers of the vehicle for supporting the small articles which ordinarily become lost readily and so that such articles will be readily convenient when desired.

Another object of the invention is to provide a fabric receptacle having a supporting frame and which is capable of being folded into a compact unit when not in use or which may be readily extended and supported by demountable hooks on the back of the front seat of a vehicle.

Still a further object of the invention is to provide a container of the aforedescribed character which is so constructed that once in an applied position it will readily maintain itself in an extended position for use and may only be folded after removal from the structure upon which it is supported.

Various other objects and advantages of the invention will hereinafter become more fully apparent from the following description of the drawing, illustrating a preferred embodiment thereof, and wherein:

Figure 1 is a front elevational view showing the container or receptacle in an applied position;

Figure 2 is an end elevational view thereof in an applied position;

Figure 3 is a cross sectional view of the container or receptacle, taken substantially along a plane as indicated by the line 3—3 of Figure 1, and Figure 4 is a perspective view showing the container or receptacle detached.

Referring more specifically to the drawing, the novel auxiliary receptacle or container for passenger automobiles, designated generally 5, includes an elongated bar, designated generally 6 formed of two corresponding end sections 7 and two corresponding intermediate sections 8. The intermediate sections 8 are hingedly connected together in end-to-end relationship by hinge 9 attached to the outer side thereof and the outer ends of said bar sections 8 are connected in end-to-end relationship with the inner ends of the outer sections 7 by hinges 10 which are mounted on the opposite or inner side of the bar 6.

The bar sections 8, adjacent their remote ends, are provided with outwardly projecting headed studs 11 which are disposed on the outer side of said bar 6 and each of which is adapted to demountably support a hook 12 thereon. The shank ends of the hooks 12 are each provided with a longitudinally extending slot 13 having an enlarged inner or upper end 14 through which the head of the stud 11 is passable and by positioning the shank portions of the studs 11 in engagement with the slots 13, which are of a width less than the diameter of the heads of the studs 11, it will be readily apparent that the hooks 12 may be demountably supported on the bar 6 to extend inwardly or rearwardly with respect thereto for engagement over the upper edge of the back of the front seat of a vehicle, indicated at 15 in Figures 1 and 2, for positioning said bar substantially horizontally across the rear portion of the seat back 15.

A strip of fabric 16 is secured along one longitudinal edge thereof in any suitable manner, such as by a bonding medium, to the lower portion of the outer side of the bar 6 and the other or opposite edge of said fabric 16 is folded outwardly and upwardly so that the upper edge thereof is disposed below the anchored edge and the overlying portions of the fabric 16 are stitched transversely at 17 at the ends thereof and at spaced points intermediate of the ends to provide a plurality of pockets 18 and 19. The secured edge of the fabric 16 is provided with notches 20 adjacent the hinged joints of the bar sections 7 and 8 so that the fabric 16 will not interfere with the folding of the bar sections 7 and 8.

It will be readily obvious that the auxiliary receptacle 5 may be positioned, as illustrated in Figures 1 and 2 on the rear side of the back 15 of the front seat of a passenger motor vehicle. The pockets 18 and 19 will be readily available to all of the passengers thereof as containers for miscellaneous items. The hooks 12 by engagement over the upper edge of a seat back 15 will support the receptacle 5 and the weight of said receptacle will hold the studs 11 in engagement with the lower ends of the slots 13 to prevent accidental disengagement of said hooks. Engagement of the hooks 12 with the seat back will prevent the bar sections 8 from folding and engagement of the bar sections 7 against the seat back will prevent said sections from folding inwardly due to the fact that the section 7 can be folded only in the direction as indicated by the arrows 21 in Figure 4 while the sections 8 fold relatively to one another in the opposite direction. Accordingly, it will be readily obvious that when the receptacle 5 is not in use the hooks 12 may be detached and placed in one of the pockets thereof after which the receptacle can be folded into a compact bundle for storage.

Various modifications and changes are contemplated and may obviously be resorted to, without departing from the spirit or scope of the invention as hereinafter defined by the appended claims.

I claim as my invention:

1. An auxiliary receptacle or container for passenger motor vehicles comprising a fabric receptacle formed of a plurality of pockets, a supporting bar secured to the upper edge of an inner ply of said receptacle and formed of a plurality of sections hingedly connected in end-to-end relationship, and a plurality of hooks connected to different sections of said supporting bar and adapted to engage over the upper edge of the back of the front seat of a vehicle for supporting the receptacle on the rear side thereof.

2. An auxiliary receptacle as in claim 1, said bar comprising intermediate sections to which said hooks are connected and which are hingedly connected for swinging movement toward one another in one direction, and said bar also including end sections hingedly connected to swing inwardly of one another in the opposite direction to the hinged movement of the intermediate sections, said outer section being held in extended position, when the receptacle is applied to the seat back by engagement of said end section therewith.

3. An auxiliary receptacle or container for passenger motor vehicles comprising a fabric receptacle formed of a plurality of pockets, a supporting bar secured to the upper edge of an inner ply of said receptacle and including two sections hingedly connected in end-to-end relationship, and a hook connected to each of said sections of the supporting bar and adapted to engage over the upper edge of the back of the front seat of a vehicle for supporting the receptacle on the rear side thereof and for retaining said bar sections in extended position.

4. An auxiliary receptacle or container for passenger motor vehicles comprising a fabric receptacle formed of a plurality of pockets, a supporting bar secured to the upper edge of an inner ply of said receptacle, and a plurality of hooks connected to an intermediate portion of said supporting bar and adapted to engage over the upper edge of the back of the front seat of a vehicle for supporting the receptacle on the rear side thereof, said supporting bar including end sections hingedly connected to said intermediate portion for folding movement in a direction toward the back of the front seat and adapted to be retained in extended positions by engagement with the back of the front seat when the receptacle is in an applied position.

NAN C. WADDILL.

REFERENCES CITED

The following references are of record in the file of this patent:

UNITED STATES PATENTS

| Number | Name | Date |
|---|---|---|
| 1,527,056 | Martin | Feb. 17, 1925 |
| 1,656,339 | Runyan | Jan. 17, 1928 |
| 2,307,331 | Parker, Jr. | Jan. 5, 1943 |